United States Patent [19]

Landers, Jr.

[11] Patent Number: 4,959,773
[45] Date of Patent: Sep. 25, 1990

[54] ADAPTER FOR ATTACHING I/O DEVICES TO I/O COMMUNICATIONS WITH ALTERNATING READ AND WRITE MODES LINK

[75] Inventor: John D. Landers, Jr., Raleigh, N.C.

[73] Assignee: International Business Machines Corporation, Armonk, N.Y.

[21] Appl. No.: 143,283

[22] Filed: Jan. 7, 1988

Related U.S. Application Data

[63] Continuation of Ser. No. 672,512, Nov. 19, 1984, abandoned.

[51] Int. Cl.⁵ .................. G06F 13/00; G06F 15/62
[52] U.S. Cl. .................. 364/200; 364/239; 364/239.2; 364/237.3
[58] Field of Search .................. 340/799; 364/200 MS File, 900 MS File

[56] References Cited

U.S. PATENT DOCUMENTS

| | | | |
|---|---|---|---|
| 3,774,161 | 11/1973 | Chambers | 340/799 |
| 4,023,142 | 5/1977 | Woessner | 364/200 |
| 4,075,695 | 2/1978 | Lelke | 364/200 |
| 4,232,376 | 11/1980 | Dion et al. | 340/750 |
| 4,322,812 | 3/1982 | Davis et al. | 364/900 |
| 4,398,265 | 4/1983 | Puhl | 364/900 |
| 4,513,390 | 4/1985 | Walter | 364/900 |
| 4,559,620 | 12/1985 | Blair | 367/78 |
| 4,573,115 | 2/1986 | Halgrimson | 364/138 |
| 4,574,358 | 3/1986 | Peterson | 364/550 |
| 4,575,803 | 3/1986 | Moore | 364/551 |
| 4,608,688 | 8/1986 | Hansen et al. | 371/10 |
| 4,656,596 | 4/1987 | Thaden et al. | 364/521 |

Primary Examiner—Lawrence E. Anderson
Attorney, Agent, or Firm—Joscelyn G. Cockburn

[57] ABSTRACT

A circuit arrangement (adapter) for attaching a display device to a serial I/O channel is disclosed. The circuit arrangement captures a serial message of indeterminate length and places said message unit into a refresh RAM in a synchronous manner during non-display periods. The circuit arrangement includes a microprocessor whose address and data buses are coupled to a microprocessor RAM and through control circuitry to the address and data buses of a refresh RAM. Data is transferred at high speed from the serial I/O channel to the microprocessor RAM. When the microprocessor executes a read command, the microprocessor RAM is placed in a "read mode" while the refresh RAM is placed in a "write" mode. Data at the address selected in the microprocessor RAM is transferred to an identical address in the refresh RAM. Similarly, data can be transferred from the refresh RAM into the microprocessor RAM. Thus, the execution of a single command at a single address results in the selection of two RAMs.

6 Claims, 5 Drawing Sheets

FIG. 5

READ WRITE LOGIC TRUTH TABLE

| RD | WR | MPU TO DISPLAY | DISPLAY TO MPU | MPU OE | MPU WE | DISPLAY OE | DISPLAY WE | XCVR DIR | XCVR ENA | MUX SELECT | FUNCTION |
|---|---|---|---|---|---|---|---|---|---|---|---|
| X | 1 | 1 | 1 | X | 1 | 0 | 1 | 1 | 1 | 1 | NORMAL PROCESSOR READ |
| 1 | X | 1 | 1 | 1 | X | 0 | 1 | 1 | 1 | 1 | NORMAL PROCESSOR WRITE |
| X | 1 | 0 | 1 | X | 1 | 1 | X | 1 | X | 0 | PROCESSOR RAM COPIED TO DISPLAY RAM |
| 1 | X | 0 | 1 | 1 | X | - | - | - | - | - | INVALID |
| X | 1 | 1 | 0 | X | 1 | X | - | 0 | X | 0 | DISPLAY RAM COPIED TO PROCESSOR RAM |
| 1 | X | 1 | 0 | 1 | X | - | - | - | - | - | INVALID |
| X | 1 | 0 | 0 | X | X | - | - | - | - | - | INVALID |
| 1 | X | 0 | 0 | X | X | - | - | - | - | - | INVALID |

INPUTS — OUTPUTS

X = don't care

ADAPTER FOR ATTACHING I/O DEVICES TO I/O COMMUNICATIONS WITH ALTERNATING READ AND WRITE MODES LINK This is a continuation of Ser. No. 672,512, filed Nov. 19, 1984, now abandoned.

BACKGROUND OF THE INVENTION

1. Field of the Invention

The present invention relates to interface circuit arrangements in general and more particularly to interface circuit arrangements that connect I/O devices to data processing systems.

2. The Prior Art

Either a parallel communications network or a serial communications network has been used to provide communication between a data processing system and I/O terminals. Such I/O terminals may include displays, keyboards, scanners, etc. Most data processing systems and related I/O terminals differ in their designs and/or operation. In order to provide a somewhat standardized communications network an adapter is often used to capture and/or deliver data and other information to or from the communications network.

In the case of a parallel communications network the adapter is attached to a parallel data bus. When the I/O terminal is a display unit, data is read out of or written into a display random access memory (RAM) during a non-refreshed period (typically during horizontal and/or vertical retrace). Since this is an asynchronous event, relative to the bus timing, a read/write (R/W) control logic performs the synchronization necessary to get data into or out of the RAM during a non-display period. Although this technique works well for its intended purpose, it has several drawbacks including the fact that a multi-wire data bus is needed. Such multi-wire data buses are usually costly. In addition, the main engine or system microprocessor which places data on the multiplexor bus must wait for the adapter or be interrupted by it.

In the case of a serial communications network, a data format conversion circuit associated with each terminal is located at the parallel data processing system for converting parallel data to serial data and transmitting the serial data on a pair of lines running to each terminal. In most systems, two additional lines are used for carrying serial data from the terminals to the data processing system. The serial data is delivered to another data format conversion circuit which converts the serial data into parallel data. In this arrangement, at least two data format conversion circuits are needed at the central data processing system.

In an improvement aimed at reducing the component count of the prior art circuitry, U.S. Pat. No. 4,377,843 describes a data distribution interface in which a single data format conversion circuitry is used at the data processing system to effectuate parallel to serial conversion and vice versa.

SUMMARY OF THE INVENTION

It is therefore the general object of the present invention to provide a more efficient interface circuitry for attaching an I/O device to a serial communications link.

The interface circuit includes a microprocessor having its own serializer/deserializer. Data is received from a host processor, via the serial communications link, and is placed into the working storage area of the microprocessor. Once the serial message has been received, the local processor manipulates the data and places it at the same address that it would be in if it were in the refresh memory of a display. At a preassigned time (preferably the vertical retrace time) the address bus of the microprocessor is switched into the address bus of the refresh memory. The microprocessor then executes a "read" instruction on its own working storage area but at an address which is identical to the address in refresh memory which is to be updated by data stored in the microprocessor working storage area. The processor's working storage area is placed in a "read" mode while the refresh memory is placed in the "write" mode. The data bus of the processor is switched into the data bus of the refresh memory. As a result, the data which is read from the processor working storage area is transferred to the refresh RAM to update the contents therein. Similarly, a single "read command" can be used for transferring data from the refresh RAM into the microprocessor RAM.

BRIEF DESCRIPTION OF THE DRAWINGS

FIG. 5 shows a truth table for the read/write control circuitry.

DETAILED DESCRIPTION OF THE PREFERRED EMBODIMENT

Figure 1:
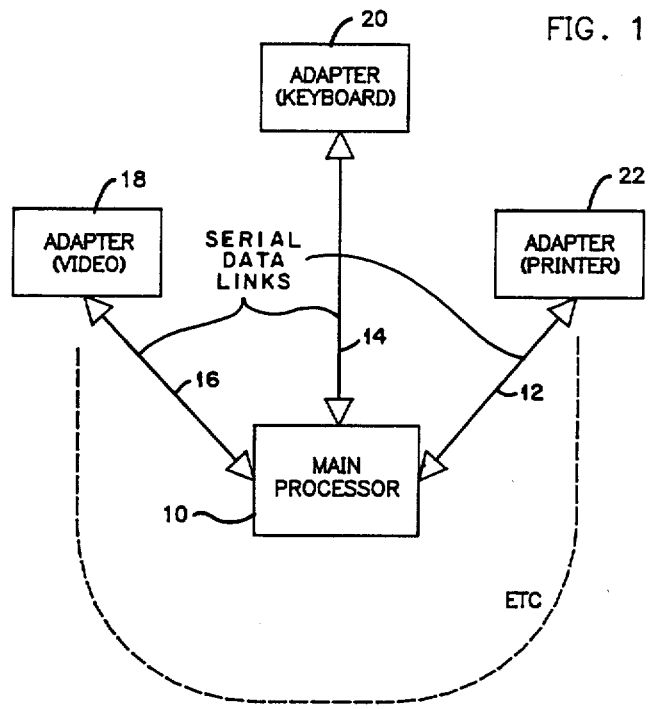
FIG. 1 shows a block diagram of a computing system embodying the teachings of the present invention.

FIG. 1 shows a distributive computing system wherein the adapter of the present invention may be used. The distributive computing system includes a main microprocessor identified by numeral 10. A plurality of high speed serial communications links identified by numerals 12, 14 and 16 interconnect the main processor 10 to a plurality of adapters identified by numerals 18, 20 and 22. Each adapter in turn interconnects an I/O device (not shown) to the high speed data link. By way of example, adapter 22 can be used to connect a printer to the main processor. Likewise, adapter 20 may be used to interconnect a keyboard (KYBD) to the main processor. Finally, the adapter 18 may be used to attach the video display device to the main processor.

In a typical installation, such as may be found in a store, data is collected by the I/O devices, processed by the respective adapters and is transferred over the serial data link to the main processor. Likewise, data for a particular device is transferred over the data link via the adapter to the respective I/O device.

Although the present invention may be used in other environments, it works well in attaching a video display device to the main processor of FIG. 1 and as such will be described in that environment. However, this should not be construed as a limitation on the scope of the present invention since it is within the skill of one skilled in the art to make minor changes and/or adjustments to the below-described adapter without departing from the scope of the present invention.

Figure 2:
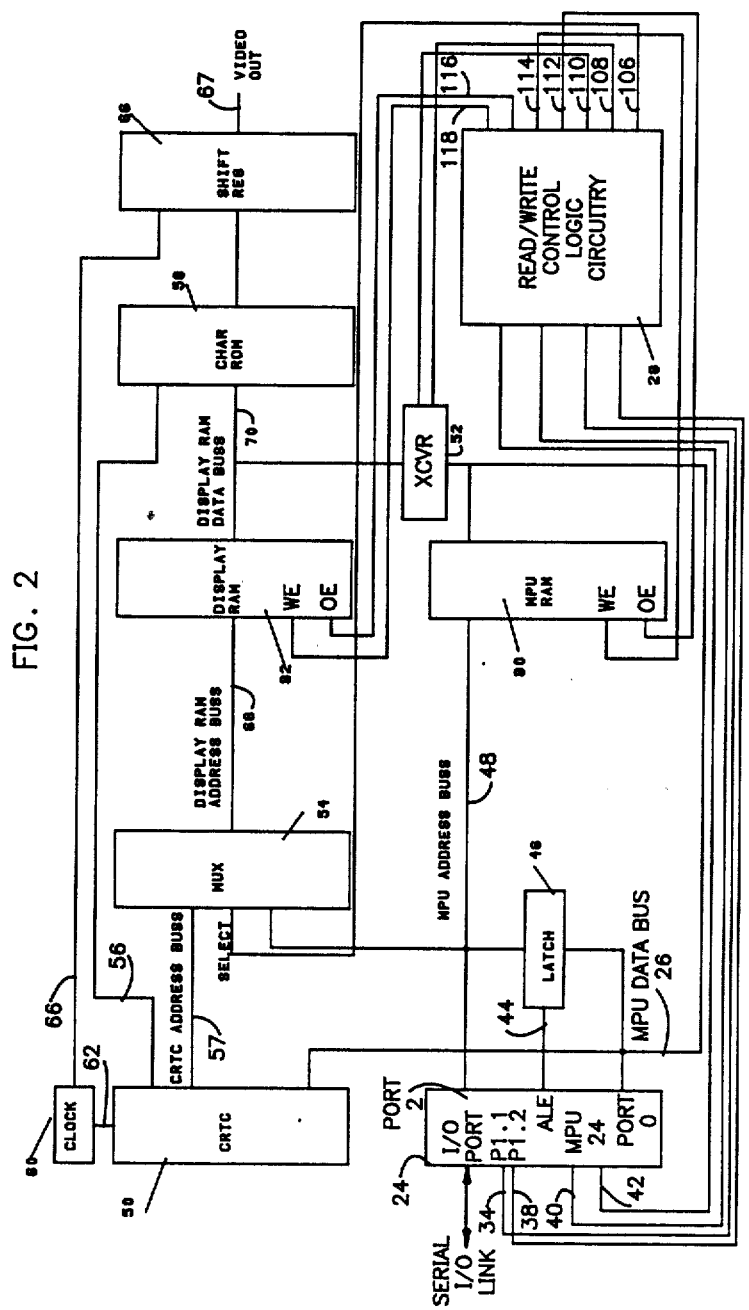
FIG. 2 shows a block diagram of the invention according to the teachings of the present invention.

FIG. 2 shows a block diagram of the adapter according to the teaching of the present invention. The adapter includes a microprocessor unit (MPU) identified by numeral 24. The microprocessor unit is the main controller for the adapter. To this end, the I/O port of the adapter is coupled to the serial I/O link. The microprocessor further includes a serializer/deserializer (not shown) which accepts serial data from the serial I/O link, converts it into parallel data and outputs it on MPU data bus 26. Furthermore, the microprocessor is programmed to generate and place a control signal called "MPU to Display" on one of its output PINs. In FIG. 2 the signal is generated and is provided at PIN (P1.1). Of course, the signal could have been placed on any other output pin. As will be explained subsequently, the function of this signal is to inform the read/write control circuitry identified by numeral 28, (details to be given later) to generate the necessary control signals that enable data recorded in the storage area identified as MPU RAM 30 to be transferred into the second storage means identified as display RAM 32. The MPU to display signal is supplied over conductor 34 to the read/write control circuitry. Similarly, a signal identified as "Display to MPU" is generated by the microprocessor unit and is outputted at PIN (P1.2). The function of this signal is to inform the read/write control circuitry to generate the appropriate signals which enable data to flow from display RAM 32 into MPU RAM 30. The Display to MPU signal is fed over conductor 38 into read/write control circuitry 28. MPU 24 also generates and outputs, a write (WR) signal and a read (RD) signal. The read and write signals are fed over conductors 40 and 42, respectively, into the read/write control logic circuitry. As will be explained subsequently, when MPU 24 executes a "Read Command" and the selected RAM is placed in the read mode, the other RAM is placed in the write mode and the information which is read out of a particular address from the RAM that is in the read mode is written into the identical address in the RAM that is in the write mode.

MPU 24 further provides an address latch enable (ALE) signal which is fed over conductor 44 into latch 46. When the ALE signal is active, the low order byte of the address which is generated at port 0 and fed over MPU data bus 46 is latched into latch 46. It should be noted that although the control signals are shown in FIG. 2 to be taken from named ports of the microprocessor, this should not be construed as a limitation on the scope of the present invention since the ports are interchangeable and other ports can be used to provide the signals which are used to control this adapter. Also, any collection of logic, including, but not limited to, any off-the-shelf microprocessor which is manufactured as a device controller may be used to replace MPU 24. In the preferred embodiment of this invention, microprocessor unit 24 is an 8051 8-bit microcomputer manufactured by the Intel Corporation. The operation and construction of this microcomputer is described in the Intel descriptive literature and as such details of the microprocessor will not be given here. Also, latch 46 includes 8 latches or 8 D-type flip-flops fabricated in a single package by Texas Instruments, Inc., and identified by catalog number 74LS373. The electrical details and characteristics of this latch means are fully described in the literature provided by Texas Instruments and can be consulted for detailed information relative to the operation and structure of these devices.

Still referring to FIG. 2, the data bus 26 is connected to latch 46, cathode ray tube controller (CRTC) 50, MPU RAM 30, and transceiver (XCVR) 52. The CRT controller 50 provides the interface between the MPU 24 and a raster-scan CRT display. This is an off-the-shelf device and details of the construction and electrical circuitry will not be given here. Suffice it to say that in the preferred embodiment of this invention the MC6845 CRT controller manufactured by Motorola was used. Details of this CRT controller can be obtained from the Motorola literature. The CRTC address bus (57) is connected to multiplexor (MUX) 54. Also, a character slice address bus (56) is fed character generator ROM (Read Only Memory) 58. The function of the signal on bus 56 is to provide the address at the particular horizontal slice of the character to be displayed to the character generator ROM (58). The combination of the character slice address generated by CRTC (50) and the character itself generated by display RAM (32) provide to the character generator ROM (58) an address that points to the particular slice of a particular character. This slice output from character generator ROM (58) is applied to shift register (66) which converts it to a serial data stream (video, 67) which is used to turn the beam on and off on a RASTER scan CRT display.

Clock pulses are generated by clock 60 and are fed over conductor 62 to the CRTC 50 and over conductor 64 to shift register 66.

Still referring to FIG. 2, the MPU address bus 48 is coupled to the display RAM address bus 68 by multiplexor means 54. A signal called "Select" and identified by numeral 106 is fed from read/write control logic circuit 28 into the multiplexor 54. The function of multiplexor 54 is to select which address bus is applied to display RAM address bus 68. The "select" signal (106) is used to determine which address the multiplexor (54) will select. In one state, the CRTC address bus (57) is selected, while in the other state the MPU address bus (48) is selected.

In the preferred embodiment of this invention, 3 multiplexor fabricated by Texas Instruments and identified by the manufacturer's number SN74LS157 connected in tandem were used. Of course, other multiplexor configurations may be used without departing from the scope of the present invention.

Display RAM address bus 68 connects the display RAM 32 to the multiplexor 54. Also, display RAM data bus 70 couples the display RAM 32 to the character generator ROM 58. Transceiver (XCUR) 52 couples the display RAM data bus 70 into MPU data bus 26. The transceiver 52 is an off-the-shelf device whose function is to allow asynchronous two-way communications between data buses. This device allows data to flow from the display RAM data bus 70 to the MPU data bus 26 and vice versa. In the preferred embodiment of this invention the 74LS245 transceiver manufactured by Texas Instruments was used.

Still referring to FIG. 2, the control signals that enable the above components so that data flows from display RAM 32 into MPU RAM 30 or from MPU RAM 30 into display RAM 32 is generated by read/write control logic circuit means 28. The control logic circuit is activated by a read, write, MPU to display and display to MPU control signals which are generated by MPU 24 and are fed over conductors 42, 40, 34 and 38, respectively, into the read/write control logic circuit 28. The read/write control logic circuit means 28 processes the input signals and generates therefrom a display RAM read (OE) signal, a display RAM Write (WE) signal, an MPU RAM Read (OE) signal, an MPU RAM Write (WE) signal, an XCVR enable signal, a XCVR direction signal and a MUX select signal. Each of these signals is fed over appropriate conductors into XCVR 52, MPU RAM 30, display RAM 32 and MUX 54. For example, the MUX select signal is generated on conductor 106; the XCVR direction signal on conductor 108; the XCVR enable signal on conductor 110; the MPU RAM OE signal on conductor 112; the MPU RAM WE signal on conductor 114; the display RAM OE signal on conductor 116 and the display RAM WE signal on conductor 118.

Figure 3:
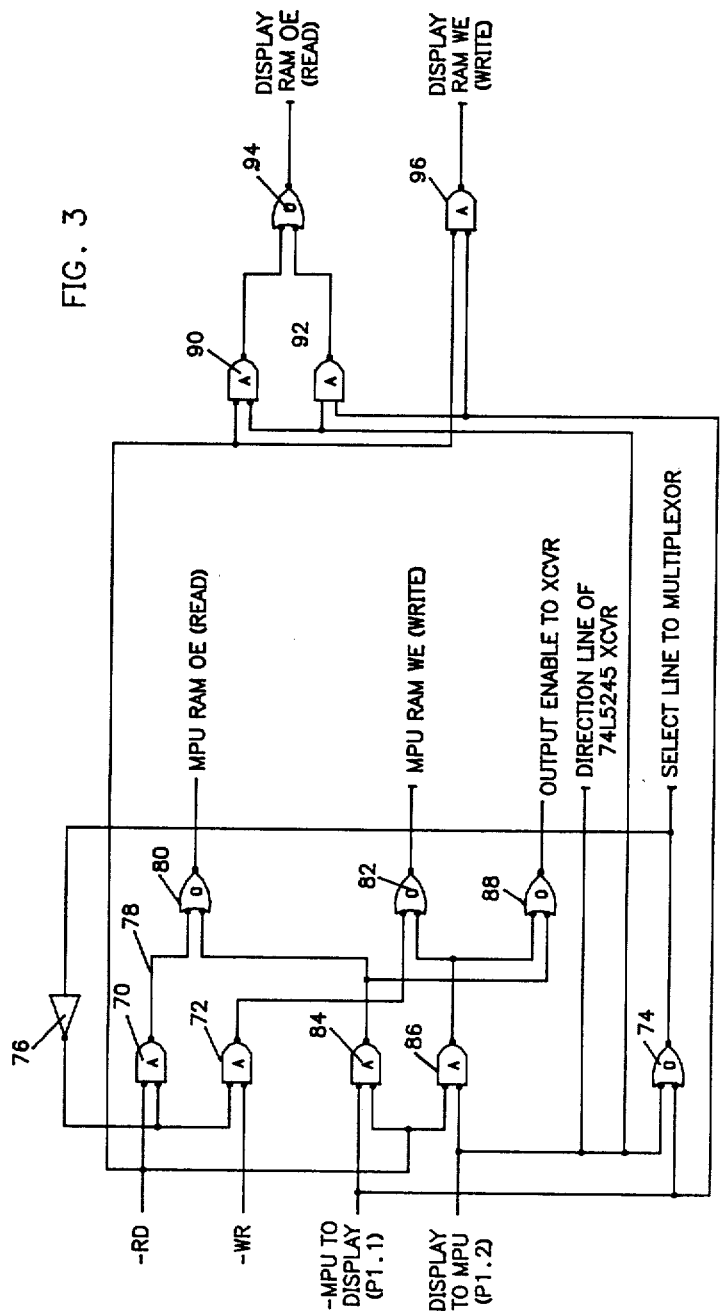
FIG. 3 shows the details for a read/write control circuitry.

FIG. 3 shows the details of read/write control logic circuit means 28. The circuit includes a pair of NAND logic circuit blocks identified by numerals 70 and 72, respectively. The read (RD) signal from the MPU is fed into one input of NAND block 70 while the signal on the other input to NAND block 70 is the output from NOR block 74 via inverter 76. The output from NAND block 70 is fed over conductor 78 into NOR block 80. The other input to NOR block 80 is fed from NAND block 84. NAND block 84 is a two-way NAND block which is supplied by the read signal and the MPU to display signal from the MPU. Likewise, NAND block 86 is a two-way NAND block and is supplied with the read signal and the display to MPU signal. The output from NOR block 80 is a read signal which is identified as MPU RAM OE. The write signal to the MPU RAM (MPU RAM WE) is outputted from NOR block 82. The input to NOR block 82 is formed from the output of NAND blocks 72 and 86, respectively. NAND block 72 is a two-way NAND block which is supplied by the write (WR) signal and the output from NOR block 74 via inverter 76.

The output enable to XCVR signal is generated from NAND block 88. The output from NAND blocks 84 and 86, respectively, are fed into NAND block 88. The Select Line signal to multiplexor 54 (FIG. 2) is generated from NOR block 74. The input signals to NOR block 74 are comprised of the Display to MPU and the MPU to Display signals.

The read signal to the RAM identified as (Display RAM OE) (Read) is generated by NAND blocks 90, 92 and NOR block 94. The inputs to NAND blocks 90 and 92 are read signal, Display to MPU signal, and MPU to display signal. The output from NAND blocks 90 and 92 are fed over respective conductors to NOR block 94.

Finally, the write signal to the display RAM identified in FIG. 3 as Display RAM WE (Write) is outputted from NAND block 96. The input to NAND block 96 is supplied from the display to MPU signal and the read signal.

Figure 4:
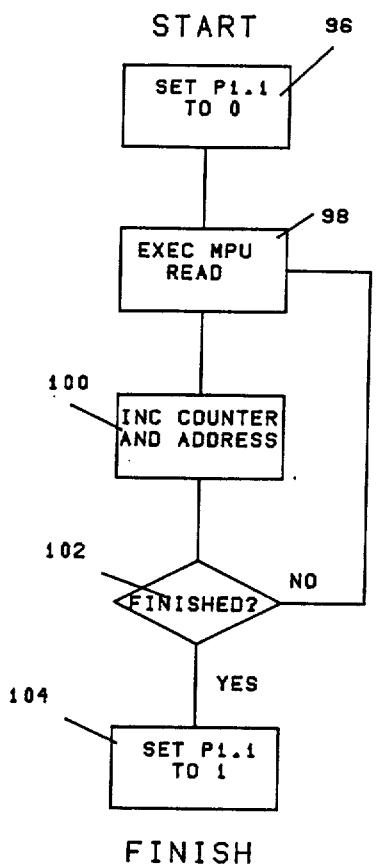
FIG. 4 shows a flow chart for programming the adapter's microprocessor.

FIG. 4 shows a flow chart for programming the 8051 MPU so that a copy of the information in the MPU RAM can be transferred to the display RAM. It should be noted that for a copy of the display RAM to be transferred to the MPU RAM P1.2 (FIG. 2) should be set and cleared rather than P1.1. Also, the input conditions are that the data pointer (DPTR) should be set to the starting address of the RAM to be copied and that register R0 (in the MPU) contains the number of bytes to be copied.

Still referring to FIG. 4, block 96 defines the first step in the process to control the processor. The first is a functional one that requires the output PIN P1.1 (FIG. 2) to be set to a logical "0." From block 96 the program descends into block 98 where an MPU read command is executed by the processor. The program then descends into block 100 where the address pointer and a counter are incremented. The program then descends into block 102 where it determines if the full range of addresses is copied. If the full range of address is copied, the program descends into block 104 where it sets P1.1 to a logical "1" and exits the routine. However, in block 102, if the full range of addresses was not copied, then the program enters into a loop and continues copying and updating the address counter until the full range of addresses is copied from one buffer into the next. As stated previously, the same routine can be used to effectuate the data transfer from the display buffer into the MPU buffer. In that event, the PIN P1.2 (Display to MPU) is set instead of P1.1 (MPU to Display).

FIG. 5 shows the read/write logic truth table for the logic circuit of FIG. 3. The first four columns of the table represent the input signal which is outputted from the MPU 24, FIG. 1, into read/write control logic circuit 28. The next seven columns represent the output signals which are generated from the read/write control logic circuit 28 as a result of the input signals. Finally, the last column in the table represents the function which is provided. The symbols in each column represent the state of the named signal. Thus, in order to do a normal processor read the signal on the read line into the logic circuit means has to be in a down state. The write line has to be up, the MPU to display has to be a logical 1, and the display to MPU has to be a logical 1. On the output, the MPU OE signal is down, the MPU write signal is a logical 1, the display read signal is a logical 0, the display write signal is a logical 1, and so forth. As is evident from this first example, the table is self-explanatory and as such each function will not be described. It should be noted that in reading this table the symbol indicates a low level active pulse. This concludes the detailed description.

Having described the detailed configuration of the adapter, its operation will now be given. In operation, when data is received from the host processor (FIG. 1), the data is placed into MPU RAM 30, FIG. 2. With the data in MPU RAM 30, MPU 24 manipulates the data at the same address that the data would be in if it were in display RAM 32. Stated another way, common or identical addresses in MPU RAM 30 and display RAM 32 are used to store identical data. At vertical retrace time the processor address bus is switched by multiplexor means 54 into the display RAM address bus 68. The processor then executes a read instruction at the addresses in display RAM 32 that are to be updated by data contained in MPU RAM 30. The processor memory is placed in read mode while the display RAM 32 is placed in write mode. Data busses of the display RAM and the MPU RAM 30 are connected via transceiver 52. Each address that the processor reads from MPU 52 is written into the display RAM 32 at the same location. By going through a sequence of addresses during non-display periods, data is updated in the display RAM 32. This process works in reverse as well by putting the processor RAM in write mode while reading from display RAM 32. As a result, this adapter takes a serial message of indeterminate length and puts it into the display RAM.

Having thus described my invention, what I claim as new, and desire to secure by Letters Patent is:

1. An adapter for interfacing a device with a serial data link comprising:
   a first storage means for storing data supplied from the serial data link;
   a second storage means for storing device data;
   a device address bus coupled to the second storage means;

a device data bus coupled to the second storage means;

a microprocessor coupled to the serial data link and for generating enabling signals;

a microprocessor address bus interconnecting the first storage means and the microprocessor;

a microprocessor data bus interconnecting the first storage means and the microprocessor;

a first control means for controlling the flow of data between the device data bus and the microprocessor data bus;

a second control means for interconnecting the microprocessor address bus and the device address bus; and a third control means responsive to the enabling signals and to generate other control signals for activating the first and second control means and for simultaneously placing the first storage means and the second storage means into respective read and write modes so that if the microprocessor executes a first command on the first storage means when it is in read mode data stored at a selected address in said first storage means is copied at an identical address in the second storage means and if the microprocessor executes the first command on the second storage means when it is in a read mode data stored at a selected address in the second storage means is copied in the first storage means.

2. The adapter of claim 1 further including means coupled to the second storage means for generating a stream of video data for displaying on a display device.

3. The adapter of claim 1 wherein the storage means includes a RAM device.

4. The adapter of claim 1 wherein the third means includes combinatorial logic circuitry for monitoring predetermined logic levels at said microprocessor and to generate a series of enabling signals.

5. A circuit arrangement for interfacing a display device with a data link comprising:

a microprocessor for receiving data from the data link; said microprocessor having an output address bus, an output data bus and a plurality of control lines for transmitting control signals generated by said microprocessor;

a first storage means having a first address bus connected to the output address bus and a first data bus connected to the output data bus;

a second storage means for storing data for viewing on said display device; said second storage means having a second address bus and a second data bus;

a multiplexor circuit means interconnecting the second address bus and the output address bus, said multiplexor circuit means when activated by enabling signals interconnects the second address bus and the output address bus so that the same locations are selected in the first and the second storage means;

a transceiver circuit means interconnecting the second data bus and the output data bus, said transceiver circuit means responsive to enabling signals to cause data on the second data bus to be placed on the output data bus or data on the output data bus to be placed on the second data bus; and a control means responsive to control signals generated by the microprocessor and for generating the enabling signals and other control signals which simultaneously places the first storage means and the second storage means in opposite modes so that if the microprocessor issues a read command to the first storage means data at a selected address in the first storage means is transferred to and written at a like address in the second storage means or if the microprocessor issues a read command to the second storage means data at a selected address in the second storage means is transferred to and written at a like address in the first storage means.

6. The circuit arrangement set forth in claim 5 wherein the opposite modes include a write mode and a read mode.

* * * * *